Jan. 2, 1945. J. KONSEL 2,366,338
RAZOR BLADE SHARPENER AND ADJUSTABLE MIRROR
Filed June 24, 1943 2 Sheets-Sheet 1
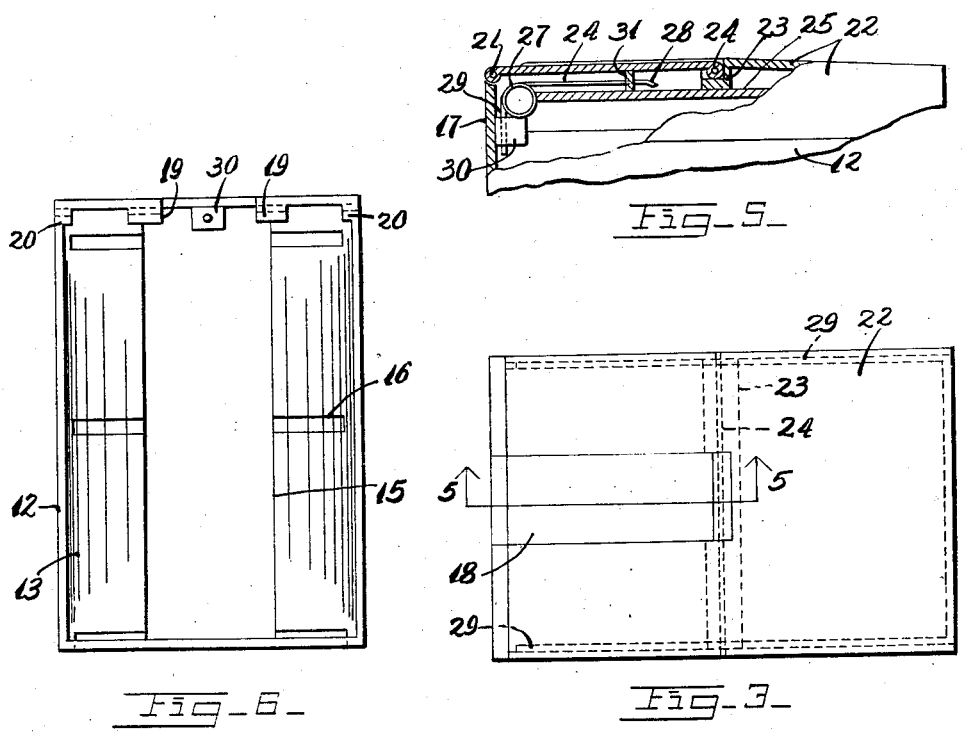
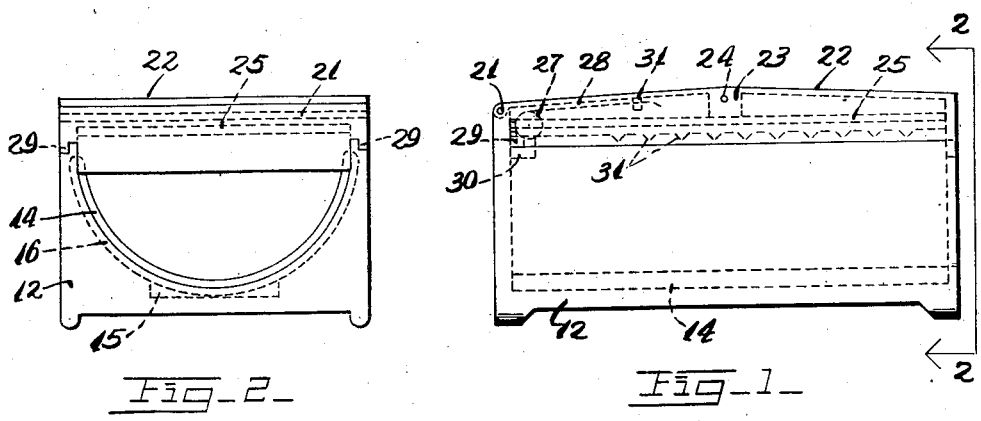
INVENTOR.
John Konsel
BY
ATTORNEY Jan. 2, 1945.  J. KONSEL  2,366,338
RAZOR BLADE SHARPENER AND ADJUSTABLE MIRROR
Filed June 24, 1943  2 Sheets-Sheet 2
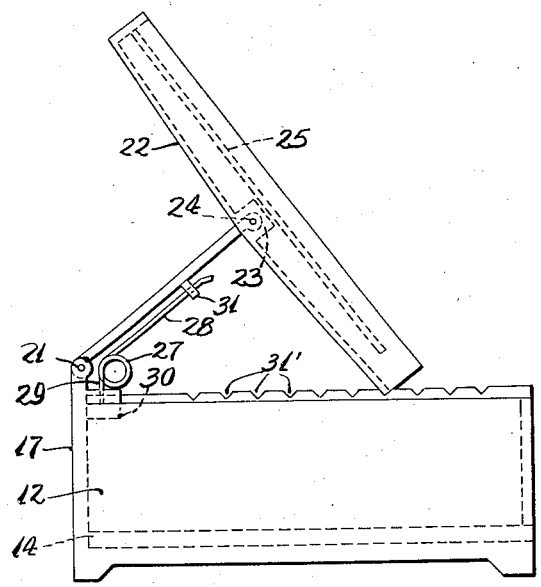
Fig-4-
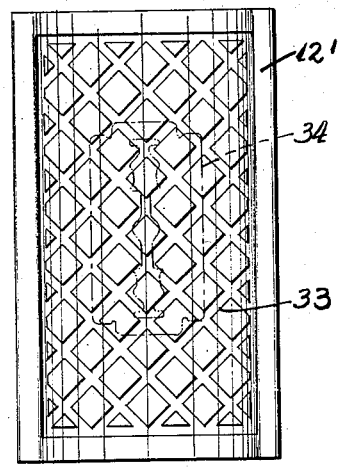
Fig-9-
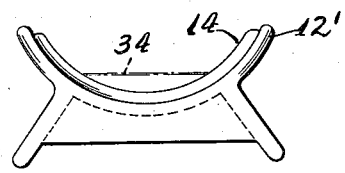
Fig-8-
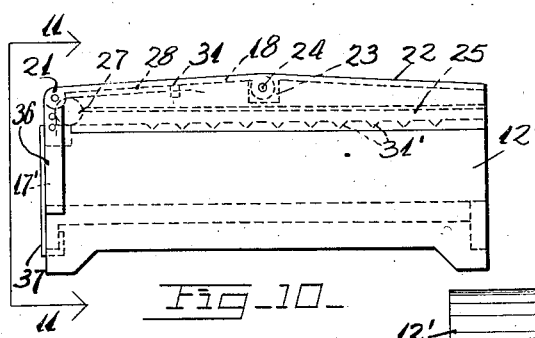
Fig-10-
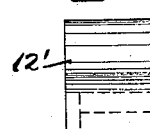
Fig-7-
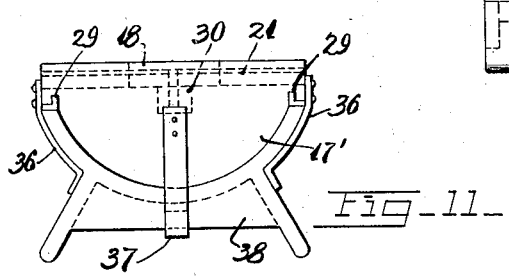
Fig-11-
INVENTOR.
John Konsel
BY
Zoltan Polachek
ATTORNEY Patented Jan. 2, 1945

2,366,338

UNITED STATES PATENT OFFICE 2,366,338

RAZOR BLADE SHARPENER AND ADJUSTABLE MIRROR

John Konsel, Massapequa, N. Y.

Application June 24, 1943, Serial No. 492,094

3 Claims. (Cl. 132—80)

This invention relates to new and useful improvements in a razor blade sharpener and adjustable mirror.

More particularly, the invention proposes to characterize said new sharpener and mirror by the fact that it includes a housing having a concaved face supporting a razor sharpening element.

It is further contemplated that said housing be provided with an end wall at one end of said concaved face; that an arm be pivotally mounted at its back end upon said wall and extend to the center of the housing, and that a cover for the housing be pivotally connected with the front end of said arm and be provided with a mirror. With this arrangement the cover may be moved to an open position in which the mirror is directed upwards and rearwards for convenience in viewing oneself.

The invention further contemplates the provision of resilient means for urging said arm downwards for holding said cover.

The invention furthermore proposes several modified forms which will become clear as this specification proceeds.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a razor blade sharpener and adjustable mirror constructed in accordance with this invention.

Fig. 2 is an end elevational view of Fig. 1 looking in the direction of the line 2—2 thereof.

Fig. 3 is a plan view of Fig. 1.

Fig. 4 is a side elevational view similar to Fig. 1 but illustrated with the adjustable mirror open.

Fig. 5 is a fragmentary longitudinal sectional view taken on the line 5—5 of Fig. 3.

Fig. 6 is a plan view of the housing of the device.

Fig. 7 is a side elevational view of a razor blade sharpener constructed in accordance with this invention.

Fig. 8 is an end elevational view of Fig. 7.

Fig. 9 is a plan view of Fig. 7.

Fig. 10 is a side elevational view similar to Fig. 7 but showing another modified form of the invention.

Fig. 11 is an end elevational view of Fig. 10 looking in the direction of the line 11—11 thereof.

The razor blade sharpener and adjustable mirror, in accordance with the form of the invention illustrated in Figs. 1 to 6, includes a housing 12 having a concaved top face 13 for supporting a razor sharpening element 14. More specifically, the concaved face 13 is formed with several grooves 15 and 16 receiving complementary projecting ribs from the sharpening element 14 for securing these parts together. The sharpening element 14 is in the nature of a piece of glass properly formed for sharpening a two edge or one edge razor blade.

An end wall 17 is located at one end of the concaved face 13. An arm 18 is pivotally connected at its back end with said end wall 17. More particularly, the end wall 17 is provided with several lug portions 19 and 20 through which a pintle rod 21 passes. This pintle rod also passes through the end of the arm 18 for accomplishing the pivotal connection called for.

The arm 18 extends substantially to the center of the housing 12. A cover 22 for the housing 12 pivotally connects with the front end of the arm 18. The bottom face of the cover 22 is hollowed out. A transverse rib 23 extends across said hollow portion. A pintle pin 24 passes through the rib 23 and through a tubular end portion formed on the end of the arm 18. A mirror 25 is mounted within the cover 22 and normally extends across and covers the rib 23.

Resilient means urges the arm 18 downwards for holding the cover 22 closed. This resilient means comprises a spring 26 having a central coiled portion 27 and projecting ends 28 and 29. The coiled portion 27 rests on a lug 30 formed on the end wall 17. The end portion 29 passes through an aperture in the lug 30. The end portion 28 passes through an aperture in a lug 31 formed on the bottom face of the arm 18.

The edge portions of the cover 22 and the contacting edge portions of the housing 12 are formed with interengaging shoulders 29. The shoulders 29 along the sides of the housing 12 are formed with notches 31' adapted to receive the bottom corner of the cover 22 when the latter is moved to an open position, for example, as illustrated in Fig. 4. In this latter position the mirror is exposed for use. It is pointed out that the bottom corner of the cover 22 may be engaged in selected notches 31' for holding the cover in a selected tilted position.

A razor blade may be placed on the razor sharpening element 14 and moved longitudinally forwards and rearwards for sharpening the edges thereof. When desired, the cover 22 may be opened to expose the mirror 25 which may then be used for shaving purposes or other purposes.

In Figs. 7 to 9 a modified form of the invention is disclosed which is very similar to the prior form, distinguishing in the fact that the housing 12' is formed with concaved sides (see particularly Fig. 8). Fig. 9 shows a detail of the razor sharpening element 14. It should be noted that it is formed with a plurality of crossing grooves 33 for sharpening dust or other substances to facilitate the sharpening of a razor blade. The dot and dash lines 34 schematically illustrate a razor blade in Figs. 8 and 9.

In other respects this form of the invention is similar to the previous form and like parts are indicated by like reference numerals.

In Figs. 10 and 11 another form of the invention is disclosed which is very similar to the form shown in Figs. 7 to 9, distinguishing in the fact that a removable end wall 17' is held upon one end of the housing 12' by several clips 36 and 37. The clips 36 are attached upon the top edges of the end wall 17' and extend down the sides of the housing 12' and grip the concave contour of the side walls of the housing. The clip 37 is mounted upon one face of the end wall 17' and extends down and around the bottom edge 38 of the housing for gripping the same.

A cover 22 is provided for the housing 12' and pivotally connects with the end wall 17 by the use of an arm 18 identically in the manner previously described. The cover 22 is also provided with a mirror 25. The sides of the cover are provided with inter-engaging shoulders 29 cooperative with the edges of the housing 12' which are also formed with a plurality of notches 31' for receiving the bottom corner of the cover 22 when the latter is tilted upwards as explained relative to the prior form of the invention.

In other respects this form of the invention is similar to that previously shown and like reference numerals identify like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A device of the class described comprising a housing for a razor sharpening element and having an end wall, an arm pivotally connected at its back end with said end wall and extending to the center of said housing, a cover for said housing pivotally connected with the front end of said arm, and resilient means urging said arm downwards for holding said cover closed, comprising a spring having a central coiled portion and projecting ends, said housing having a projecting lug supporting the coiled portion of the spring, and the ends of said spring being engaged through said lug and through another lug formed on said arm.

2. A device of the class described, comprising a housing for a razor sharpening element and having an end wall, an arm pivotally connected at its back end with said end wall and extending to the center of said housing, a cover for said housing pivotally connected with the front end of said arm, and resilient means urging said arm downwards for holding said cover closed, said end wall being of separate material from said housing and removably clipped on to the housing.

3. A device of the class described, comprising a housing for a razor sharpening element and having an end wall, an arm pivotally connected at its back end with said end wall and extending to the center of said housing, a cover for said housing pivotally connected with the front end of said arm, and resilient means urging said arm downwards for holding said cover closed, said end wall being of separate material from said housing and removably clipped on to the housing, with clips mounted on the sides of the end wall and a clip mounted on the outer face of the end wall.

JOHN KONSEL.